United States Patent
Lee et al.

(10) Patent No.: US 10,281,719 B2
(45) Date of Patent: May 7, 2019

(54) VIRTUAL REALITY DISPLAY DEVICE AND METHOD OF DRIVING THE SAME

(71) Applicant: LG Display Co., Ltd., Seoul (KR)

(72) Inventors: Joon-Hee Lee, Seoul (KR); Hee-Jung Hong, Seoul (KR); Dong-Won Park, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 52 days.

(21) Appl. No.: 15/707,717

(22) Filed: Sep. 18, 2017

(65) Prior Publication Data

US 2018/0095274 A1  Apr. 5, 2018

(30) Foreign Application Priority Data

Sep. 30, 2016 (KR) .................. 10-2016-0127056

(51) Int. Cl.
*G09G 3/00* (2006.01)
*G09G 3/20* (2006.01)
*G09G 3/36* (2006.01)
*G02B 27/00* (2006.01)
*G02B 27/01* (2006.01)
*G09G 3/3233* (2016.01)

(52) U.S. Cl.
CPC ..... *G02B 27/0012* (2013.01); *G02B 27/0172* (2013.01); *G09G 3/00* (2013.01); *G09G 3/001* (2013.01); *G09G 3/20* (2013.01); *G02B 2027/014* (2013.01); *G02B 2027/0147* (2013.01); *G09G 3/3233* (2013.01); *G09G 3/3648* (2013.01); *G09G 2310/0224* (2013.01); *G09G 2310/04* (2013.01); *G09G 2340/04* (2013.01); *G09G 2340/0407* (2013.01)

(58) Field of Classification Search
CPC ............ G09G 3/001; G09G 3/20; G09G 3/00; G09G 2310/04; G09G 2310/0224; G09G 3/3648; G09G 3/3233; G09G 2340/0407; G09G 2340/04; G02B 27/0172; G02B 2027/014; G02B 2027/0147; G02B 27/0012
See application file for complete search history.

(56) References Cited

U.S. PATENT DOCUMENTS

2016/0267716 A1* 9/2016 Patel ...................... G09G 5/395
2018/0040676 A1* 2/2018 Hack .................... H01L 27/326

\* cited by examiner

*Primary Examiner* — Menatoallah Youssef
(74) *Attorney, Agent, or Firm* — Fenwick & West LLP

(57) ABSTRACT

A display device performs efficient driving by selectively scanning a peripheral area processed to have low resolution. The display device includes a gate driver that scans a first subset of pixel rows in a first scan block including only the peripheral area during a first frame and a second frame, and respectively scan during the first frame and the second frame a second subset of pixel rows and a third subset of pixel rows in a second scan block including the medial area and the peripheral area excluding the foveal area, and scan pixel rows of pixels in a third scan block including the foveal area, the medial area, and the peripheral area during the first frame and the second frame.

20 Claims, 9 Drawing Sheets

VIRTUAL REALITY DISPLAY DEVICE AND METHOD OF DRIVING THE SAME

CROSS-REFERENCE TO RELATED APPLICATIONS

This application claims the benefit of Republic of Korea Patent Application No. 10-2016-0127056, filed on Sep. 30, 2016, which is hereby incorporated by reference in its entirety.

BACKGROUND

Field of Technology

The present disclosure relates to a virtual reality display device capable of performing efficient driving by selectively scanning a peripheral area displaying an image processed with lower resolution than a foveal area and a method of driving the same.

Discussion of the Related Art

A virtual reality (VR) system provides a realistic virtual environment to a user using a VR display device such as a head mounted display (HMD). The VR display device has been widely used in a game console, an educational device, an augmented reality system, etc.

The VR display device provides an image enlarged through lenses to a location very near to viewer's eyes and thus uses an ultra-high resolution display device having a very high pixel per inch (PPI) in spite of a small size in order to prevent faults of pixels.

Due to characteristics of the VR display device of the related art positioned near the viewer's eyes, a foveal area in which an image can be clearly recognized as a main viewing area in a display region is restrictive and an image of a peripheral area except for the foveal area is difficult for the viewer to recognize.

The VR display device of the related art may reduce data processing and transmission rate by using a method of displaying an image processed to have high resolution in the foveal area that the user views and displaying an image processed to have low resolution in the peripheral area in which a recognition degree of the user is lowered.

However, the VR display device of the related art sequentially scans an entire area upon scanning a display area without distinguishing between the foveal area in which an image processed with high resolution is displayed and the peripheral area in which an image processed with low resolution is displayed, thereby being inefficient in terms of a driving time and dissipated power.

SUMMARY

Accordingly, the present disclosure is directed to a VR display device and a method of driving the same that substantially obviates one or more problems due to limitations and disadvantages of the related art.

The present disclosure provides a display device capable of performing efficient driving by selectively scanning a peripheral area displaying an image processed with low resolution and a method of driving the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a display panel including a plurality of pixels and configured to display an image, the display panel including: a foveal area that corresponds to a main viewing area of a user, the foveal area displaying a first portion of the image; a medial area that surrounds the foveal area, the medial area displaying a second portion of the image with a lower resolution than the first portion of the image displayed in the foveal area; and a peripheral area that surrounds the medial area, the peripheral area displaying a third portion of the image with a lower resolution than the second portion of the image displayed in the medial area.

The display device further includes a gate driver configured to: scan a first subset of a plurality of rows of the pixels in a first scan block that is included in a first portion of the peripheral area during a first frame; scan a second subset of the plurality of rows of the pixels in the first scan block included in the first portion of the peripheral area during the second frame; scan a third subset of a plurality of rows of the pixels in a second scan block that is included in a first portion of the medial area and a second portion of the peripheral area excluding the foveal area during the first frame; scan a fourth subset of the plurality of rows of pixels in the second scan block that is included in the first portion of the medial area and the second portion of the peripheral area excluding the foveal area during the second frame, the fourth subset of the plurality of rows of pixels having a greater number of rows of pixels than the third subset of the plurality of rows of the pixels; and scan a plurality of rows of the pixels in a third scan block that is included in the foveal area, a second portion of the medial area, and a third portion of the peripheral area during the first frame and the second frame. The display device also includes a data driver configured to supply image data to pixels scanned by the gate driver.

In one embodiment, a method of driving a display device that includes a display panel is disclosed. The method comprises scanning a first subset of a plurality of rows of the pixels in a first scan block that is included in a first portion of the peripheral area during a first frame; scanning a second subset of a plurality of rows of the pixels in the first scan block that is included in the first portion of the peripheral area during a second frame; scanning a third subset of a plurality of rows of the pixels in a second scan block that is included in a first portion of the medial area and a second portion of the peripheral area excluding the foveal area during the first frame; scanning a fourth subset of the plurality of rows of the pixels in the second scan block that is included in the first portion of the medial area and the second portion of the peripheral area excluding the foveal area during the second frame, the fourth subset of the plurality of rows of pixels having a greater number of rows of pixels than the third subset of the plurality of rows of the pixels; scanning a plurality of rows of the pixels in a third scan block that is included in the foveal area, a second portion of the medial area, and a third portion of the peripheral area during the first frame and the second frame; and supplying image data to scanned pixels in the first scan block, the second scan block, and the third scan block during the first frame and the second frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
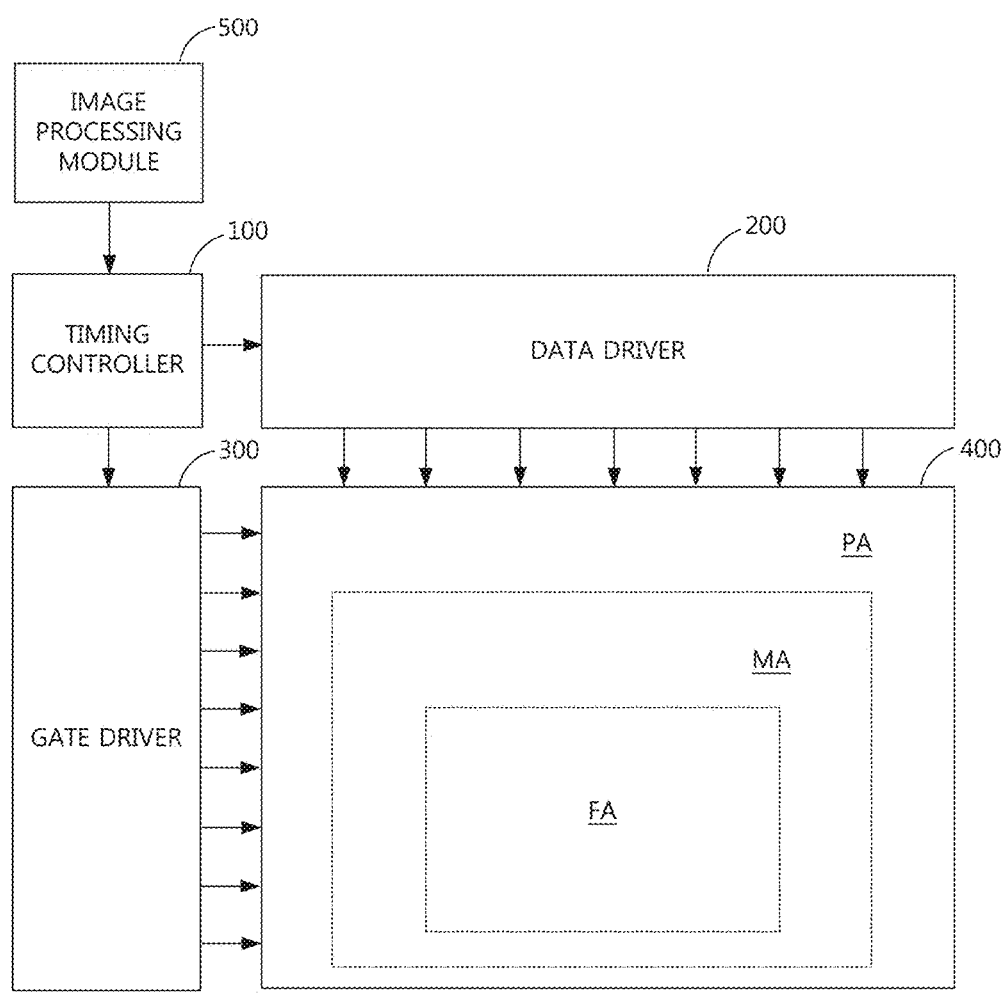
FIG. 1 is a block diagram schematically illustrating the configuration of a VR display device according to an embodiment of the present disclosure.
Figure 2:
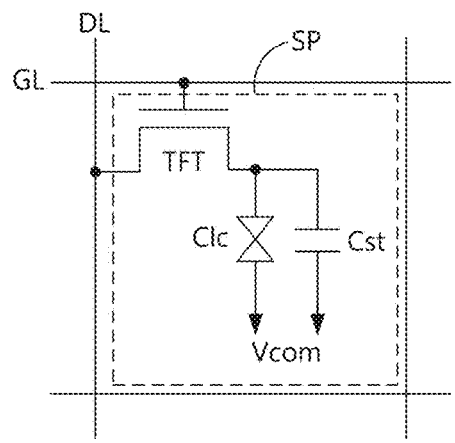
FIG. 2 is an equivalent circuit diagram illustrating the configuration of a liquid crystal display (LCD) subpixel applied to FIG. 1 according to an embodiment of the present disclosure.

FIG. 1 is a block diagram schematically illustrating the configuration of a VR display device according to an embodiment of the present disclosure, FIG. 2 is an equivalent circuit diagram illustrating the configuration of an LCD subpixel applied to FIG. 1, and FIG. is an equivalent circuit diagram illustrating the configuration of an OLED subpixel applied to FIG. 1.

The VR display device illustrated in FIG. 1 includes a timing controller 100, a data driver 200 and a gate driver 300, which are panel drivers, a display panel 400, and an image processing module 500.

The display panel 400 displays an image through a pixel array having pixels arranged in the form of a matrix. A basic pixel may be configured by at least three subpixels W/R/G, B/W/R, G/B/W, R/G/B, or W/R/G/B which can express white through a color mixture of white (W), red (R), green (G), and blue (B) subpixels.

A liquid crystal display (LCD) panel or an organic light-emitting diode (OLED) panel may be used as the display panel 400.

For example, if the display panel 400 is comprised of the LCD panel, each subpixel includes, as illustrated in FIG. 2, a thin film transistor (TFT) connected to a gate line GL and a data line DL, and a liquid crystal capacitor Clc and a storage capacitor Cst connected in parallel between the TFT and a common electrode. The liquid crystal capacitor Clc charges a difference value between a data signal supplied to a pixel electrode through the TFT and a common voltage Vcom supplied to the common electrode and drives a liquid crystal according to the charged voltage, thereby controlling light transmittance. The storage capacitor Cst stably maintains a voltage charged to the liquid crystal capacitor Clc.

Figure 3:
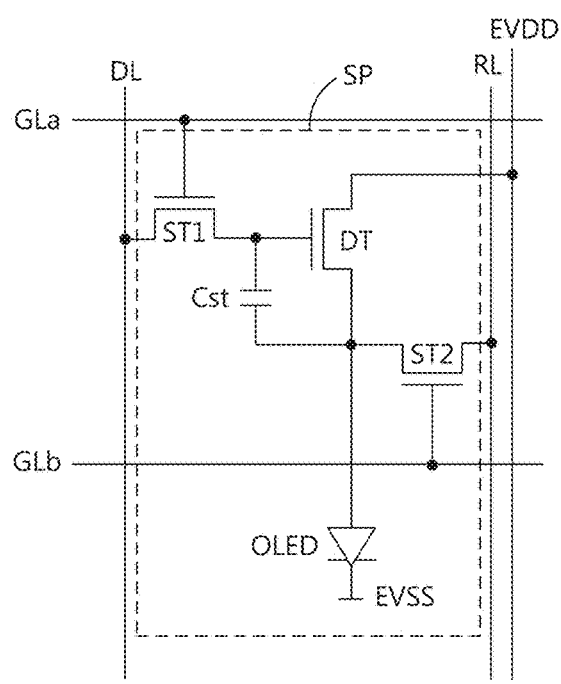
FIG. 3 is an equivalent circuit diagram illustrating the configuration of an organic light emitting diode (OLED) subpixel applied to FIG. 1 according to an embodiment of the present disclosure.

Unlike this, if the display panel 400 is comprised of the OLED panel, each subpixel includes, as illustrated in FIG. 3, an OLED element connected between a high-power voltage EVDD line and a low-power voltage EVSS line and a pixel circuit at least including first and second switching TFTs ST1 and ST2, a driving TFT DT, and a storage capacitor Cst, for independently driving the OLED element. Since the pixel circuit may be variously configured, it is not limited to the configuration illustrated in FIG. 3.

The OLED element includes an anode connected to the driving TFT DT, a cathode connected to the low-power voltage EVSS line, and a light-emitting layer connected between the anode and the cathode to generate light proportional to the amount of current supplied from the driving TFT DT.

The first switching TFT ST1 is driven by a gate signal of one gate line GLa to supply a data voltage from a corresponding data line DL to a gate node of the driving TFT DT and the second switching TFT ST2 is driven by a gate signal of another gate line GLb to supply a reference voltage from a reference line RL to a source node of the driving TFT DT. The second switching TFT ST2 may be further used as a path for supplying current from the driving TFT DT to the reference line RL in a sensing mode.

The storage capacitor Cst connected between the gate node and source node of the driving TFT DT charges a difference voltage between a data voltage supplied to the gate node of the driving TFT DT through the first switching TFT ST1 and the reference voltage supplied to the source node of the driving TFT DT through the second switching TFT ST2 and supplies the charged voltage to the driving TFT DT as a driving voltage.

The driving TFT DT controls current supplied from a supply line of the high-power voltage EVDD according to the driving voltage supplied from the storage capacitor Cst to supply current proportional to the driving voltage to the OLED, thereby causing the OLED element to emit light.

The display panel 400 includes a foveal area (FA) corresponding to a main viewing area of a viewer and a peripheral area (PA) corresponding to the periphery of the main viewing area. The display panel 400 may further include a medial area (MA) located between the foveal area (FA) and the peripheral area (PA). An image having high resolution is displayed in the foveal area (FA) of the display panel 400 and images scaled to low resolution are displayed in the medial area (MA) and the peripheral area (PA). An image scaled to lower resolution than the image in the medial area (MA) is displayed in the peripheral area (PA). In other words, the display panel 400 displays a high-resolution image in the foveal area (FA) in which a user can clearly recognize an image and displays images scaled to more and more low-resolution in the medial area (MA) and the peripheral area (PA) in which an image recognition degree of a user is lowered.

The image processing module 500 receives, from an external system, the specifications (e.g., size and resolution) of the display panel 400 and location information about the foveal area (FA), medial area (MA), and peripheral area (PA) (e.g., location information about boundaries of the respective areas) determined in consideration of a distance to the user's eyes. The external system may update the location information about the foveal area (FA), medial area (MA) and peripheral area (PA) according to variation in a viewing point of the user by tracking the viewing point of the user using a known eye tracking method and supply the updated location information to the image processing module 500.

The image processing module 500 classifies an input image into foveal area (FA) data, medial area (MA) data, and peripheral area (PA) data corresponding respectively to the foveal area (FA), medial area (MA) and peripheral area (PA) using the location information about the foveal area (FA), medial area (MA), and peripheral area (PA).

The image processing module 500 outputs image data having high resolution to the timing controller 100 as the foveal area (FA) and outputs images scaled to low resolution to the timing controller 100 as the medial area (MA) data and the peripheral area (PA) data. The image processing module 500 scales the peripheral area (PA) data to lower resolution than the medial area (MA) data.

For example, the image processing module 500 may lower the resolution of the medial area (MA) data and peripheral area (PA) data using a resolution scaling method of copying image data of one pixel onto an adjacent pixel. That is, the image processing module 500 scales the medial area (MA) data to low resolution by copying image data of one pixel onto one adjacent pixel and scales the peripheral area (PA) data to lower resolution than the medial area (MA) data by copying image data of one pixel onto three adjacent pixels.

The timing controller 100 receives image data, timing signals, and the location information about the foveal area (FA), medial area (MA), and peripheral area (PA) from the image processing module 500. Meanwhile, the image processing module 500 may be mounted in the timing controller 100.

The timing controller 100 arranges the image data supplied by the image processing module 500 and provides the arranged image data to the data driver 200. The timing controller 100 controls driving timings of the data driver 200 and the gate driver 300 using the input timing signals. The input timing signals include a dot clock, a data enable signal, a vertical synchronization signal, and a horizontal synchronization signal. Data control signals for controlling driving of the data driver 200 may include a source start pulse, a source sampling clock, and a source output enable signal. Gate control signals for controlling driving of the gate driver 300 may include a gate start pulse, a gate shift clock, and a gate output enable signal.

The timing controller 100 controls timings of the gate control signals based on the location information about the foveal area (FA), medial area (MA), and peripheral area (PA) so that the gate driver 300 may perform selective scan in a period during which a scan block including the medial area (MA) and peripheral area (PA) are scanned and controls timings of the data control signals so that the gate driver 300 may scan all lines in a period during which a scan block including the foveal area (FA) is scanned. In other words, the timing controller 100 may vary the timings of the gate control signals, for example, a timing of the gate shift clock so that the gate driver 300 may selectively scan the scan block including the medial area (MA) and peripheral area (PA).

In addition, the timing controller 100 controls an output timing of the data driver 200 so that the data driver 200 may supply data only to pixels in which scan is performed at a selective scan timing of the gate driver 300 in a period during which the scan block including the medial area (MA) and peripheral area (PA) is scanned.

The data driver 200 receives the data control signals and image data from the timing controller 100. The data driver 200 is driven by the data control signals to segment a reference gamma voltage set supplied from a gamma voltage generator into gray-level voltages, converts digital image data into an analog image data signal using the segmented gray-level voltages, and then supplies the analog data signal to each data line of the display panel 400.

The data driver 200 is comprised of a plurality of data driver ICs which separately drive data lines of the display panel 400. Each data driver IC may be mounted on a circuit film such as a tape carrier package (TCP), a chip-on film (COF), or a flexible print circuit (FPC) so as to be attached to the display panel 400 through a tape automated bonding (TAB) scheme or may be mounted on the display panel 400 through a chip-on glass (COG) scheme.

The gate driver 300 drives a plurality of gate lines of the display panel 400 using the gate control signals supplied from the timing controller 100. The gate driver 300 is comprised of at least one gate IC. The gate IC may be mounted on the circuit film such as the TCP, COF, or FPC so as to be attached to the display panel 400 through the TAB scheme or may be mounted on the display panel 400 through the COG scheme. Alternatively, the gate driver 300 may be provided as a gate-in panel (GIP) type mounted in a non-display area of the display panel 400 by being formed on a TFT substrate along with a TFT array constituting a pixel array of the display panel 400.

Figure 4:
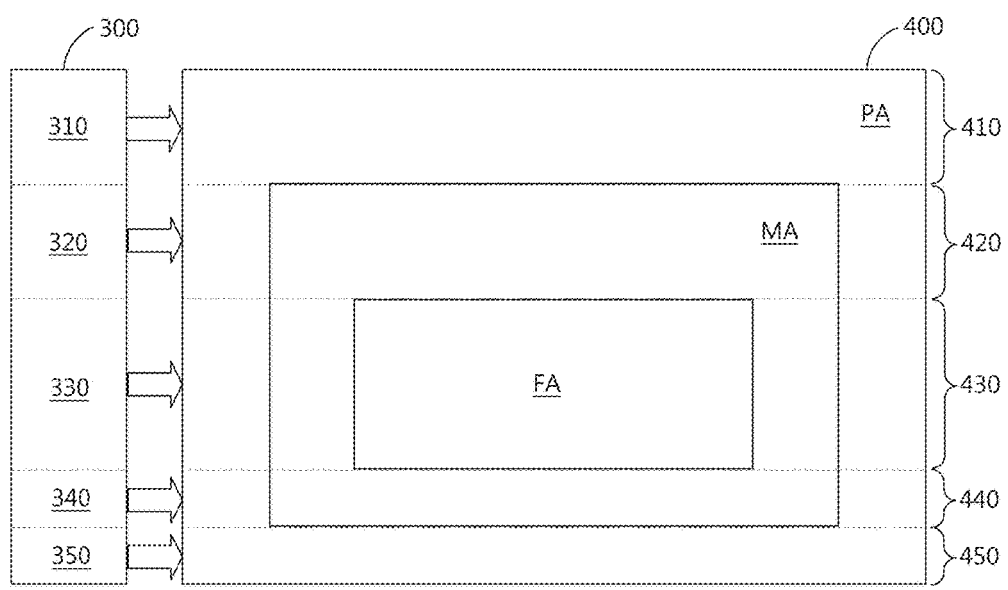
FIG. 4 is a diagram illustrating scan blocks of a display panel shown in FIG. 1 and gate driving blocks of a gate driver shown in FIG. 1 according to an embodiment of the present disclosure.
Figure 5:
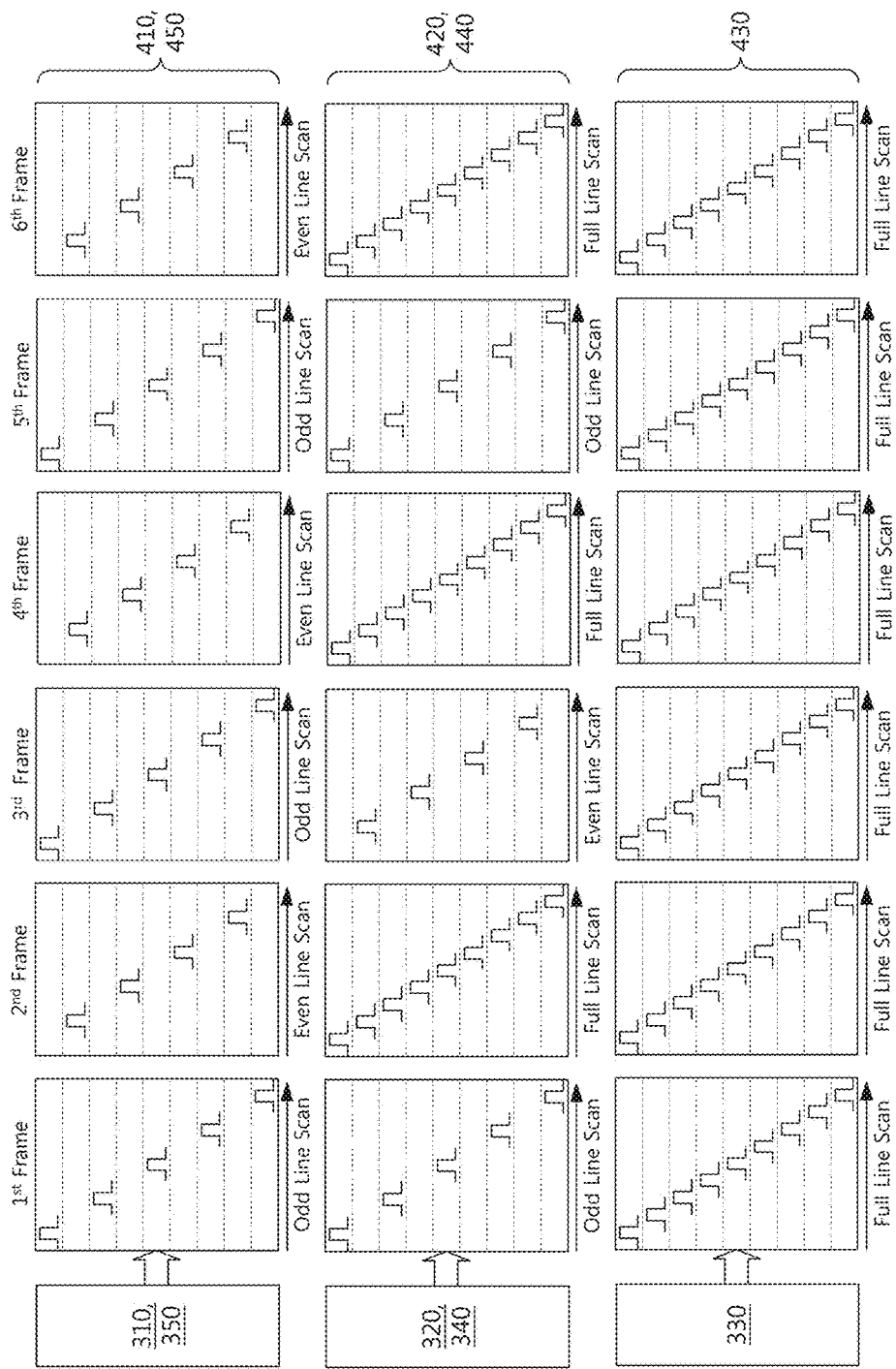
FIG. 5 is a diagram illustrating a scan method of the VR display device according to an embodiment of the present disclosure.
Figure 6:
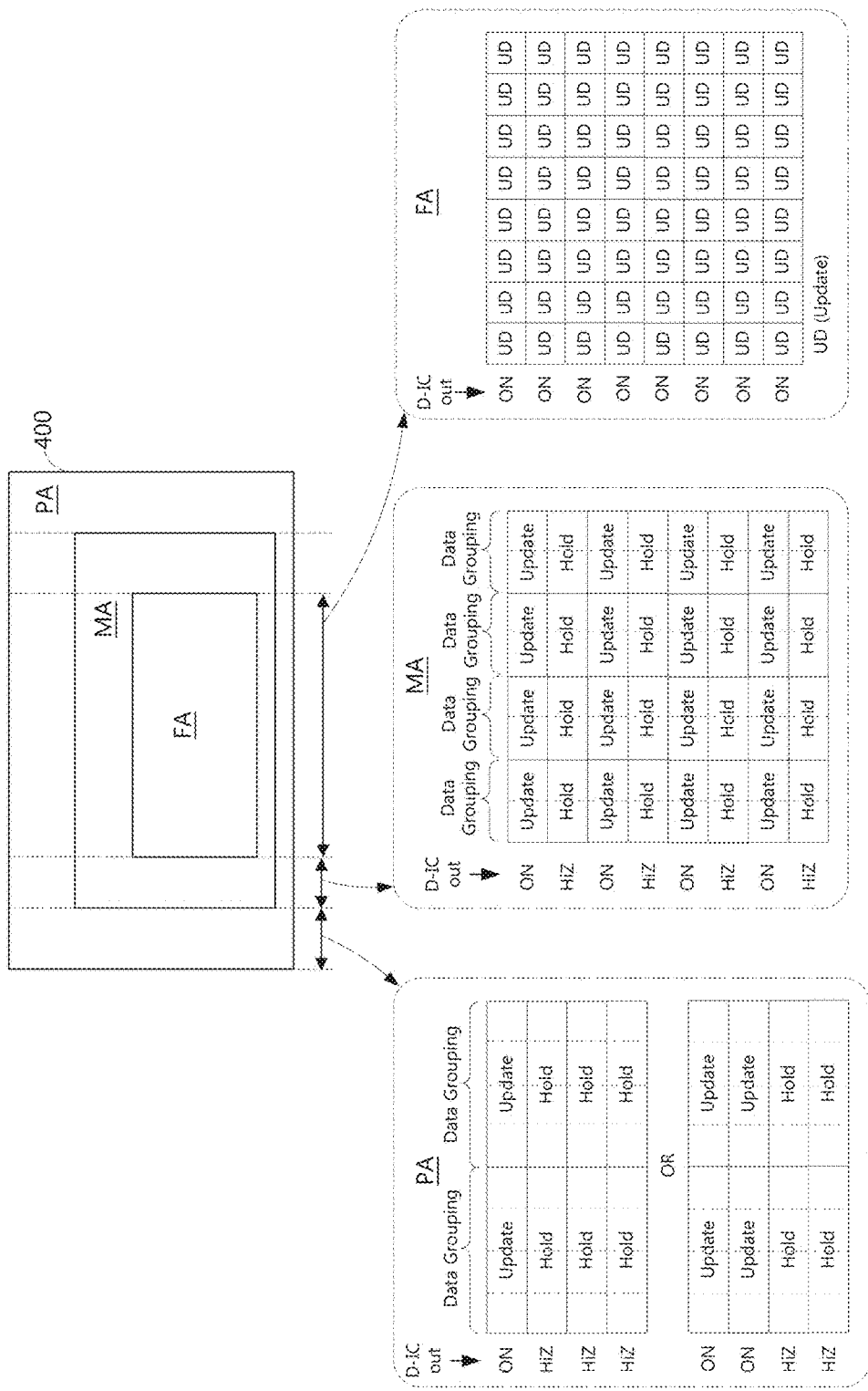
FIG. 6 is a diagram illustrating a data output method of the VR display device according to an embodiment of the present disclosure.

FIG. 4 is a diagram illustrating scan blocks of the display panel 400 shown in FIG. 1 and gate driving blocks of the gate driver 300 shown in FIG. 1, FIG. 5 is a diagram illustrating a scan method of the VR display device according to an embodiment of the present disclosure, and FIG. 6 is a diagram illustrating a data output method of the VR display device according to an embodiment of the present disclosure.

As illustrated in FIG. 4, the display panel 400 is divided into first and fifth scan blocks 410 and 450 in which only a peripheral area (PA) is located, second and fourth scan blocks 420 and 440 in which an medial area (MA) and the peripheral area (PA), except for an foveal area (FA), are located in parallel in a horizontal direction, and a third scan block 430 in which the foveal area (FA), medial area (MA), and peripheral area (PA) are located in parallel in a horizontal direction.

The gate driver 300 may be separated into and driven by first to fifth gate driving blocks 310, 320, 330, 340, and 350 for respectively driving the first to fifth scan blocks 410, 420, 430, 440, and 450.

The third gate driving block 330 sequentially scans all gate lines of the third scan block 430 including the foveal area (FA), as illustrated in FIG. 5.

The first and fifth gate driving blocks 310 and 350 selectively scan a part of gate lines of the first and fifth scan blocks 410 and 450 including only the peripheral area (PA).

For example, the first and fifth gate driving blocks 310 and 350 may sequentially scan only odd gate lines in odd frames and may sequentially scan only even gate lines in even frames, with respect to gate lines of the first and fifth scan blocks 410 and 450 including only the peripheral area (PA). Alternatively, the first and fifth gate driving blocks 310 and 350 may scan randomly selected gate lines among the gate lines of the first and fifth scan blocks 410 and 450. In this case, the positions and intervals of the scanned gate lines may be randomly varied at a predetermined frame period. If a part of the gate lines of the first and fifth scan blocks 410 and 450 in one frame are scanned, the other gate lines except for the gate lines scanned in the frame may be scanned in the next frame.

The second and fourth gate driving blocks 320 and 340 may selectively scan gate lines of the second and fourth scan blocks 420 and 440 including the medial area (MA) and peripheral area (PA) except for the foveal area (FA) and may increase the number of scans of the gate lines of the second and fourth scan blocks 420 and 440.

For example, as illustrated in FIG. 5, the second and fourth gate driving blocks 320 and 340 may fully scan all of the gate lines of the second and fourth scan blocks 420 and 440 in a (2N−1)-th (where N is a natural number) frame and may selectively scan some of the gate lines of the second and fourth scan blocks 420 and 440 in a 2N-th frame. The gate lines which are selectively scanned in every 2N-th frame may be varied.

In the first, second, fourth, and fifth scan blocks 410, 420, 440, and 450 illustrated in FIG. 4, the gate lines which are selectively scanned by the first, second, fourth, and fifth gate driving blocks 310, 320, 340, and 350 may be changed in the unit of predetermined frames.

The number of selective scans in the first and fifth scan blocks 410 and 450 may be reduced as compared with the number of selective scans in the second and fourth scan blocks 420 and 440. In other words, the number of selective scans may be further reduced in the scan blocks 410 and 450 including only the peripheral area (PA) than in the scan blocks 420 and 440 including the medial area (MA) and peripheral area (PA).

As such, since the number of scans is reduced as compared with the number of scan lines in the scan blocks 420 and 440 including the medial area (MA) and peripheral area (PA), a driving time can be shortened.

Scan blocks are driven in order of first to fifth scan blocks 410, 420, 430, 440, and 450 by sequential driving of the first to fifth gate driving blocks 310, 320, 330, 340, and 350. Alternatively, the third scan block 330 including the foveal area (FA) may be driven first by the third gate driving block 330 and then the fourth, fifth, first, and second scan blocks 340, 350, 310, and 320 may be sequentially driven according to a driving order of the fourth, fifth, first, and second gate driving blocks 440, 450, 410, and 420.

In addition, while the scan blocks 410, 420, 440, and 450 except for the third scan block 430 are selectively scanned by the first, second, fourth, and fifth gate driving blocks 310, 320, 340, and 350 respectively, the data driver 200 updates data (ON), as illustrated in FIG. 6, by supplying data only to pixels in which gate lines are scanned at selective scan timings and does not output data (HiZ) in a period during which gate lines are not scanned to hold data of a previous frame in pixels in which gate lines are not scanned.

The data driver 200 may reduce resolution in a horizontal direction by grouping data lines of the medial area (MA) and peripheral area (PA) upon driving the foveal area (FA), medial area (MA), and peripheral area (PA) which are in parallel in a horizontal direction. For example, as illustrated in FIG. 6, in the medial area (MA), the data driver 200 may group data lines in the unit of two data lines and supply the same data to the grouped data lines and, in the peripheral area (PA), the data driver 200 may group data lines in the unit of four data lines and supply the same data to the grouped data lines, thereby further reducing resolution in the horizontal direction in the peripheral area (PA) than in the medial area (MA).

As such, since a data output frequency of the data driver 200 is reduced, power consumption can be reduced.

Figure 7:
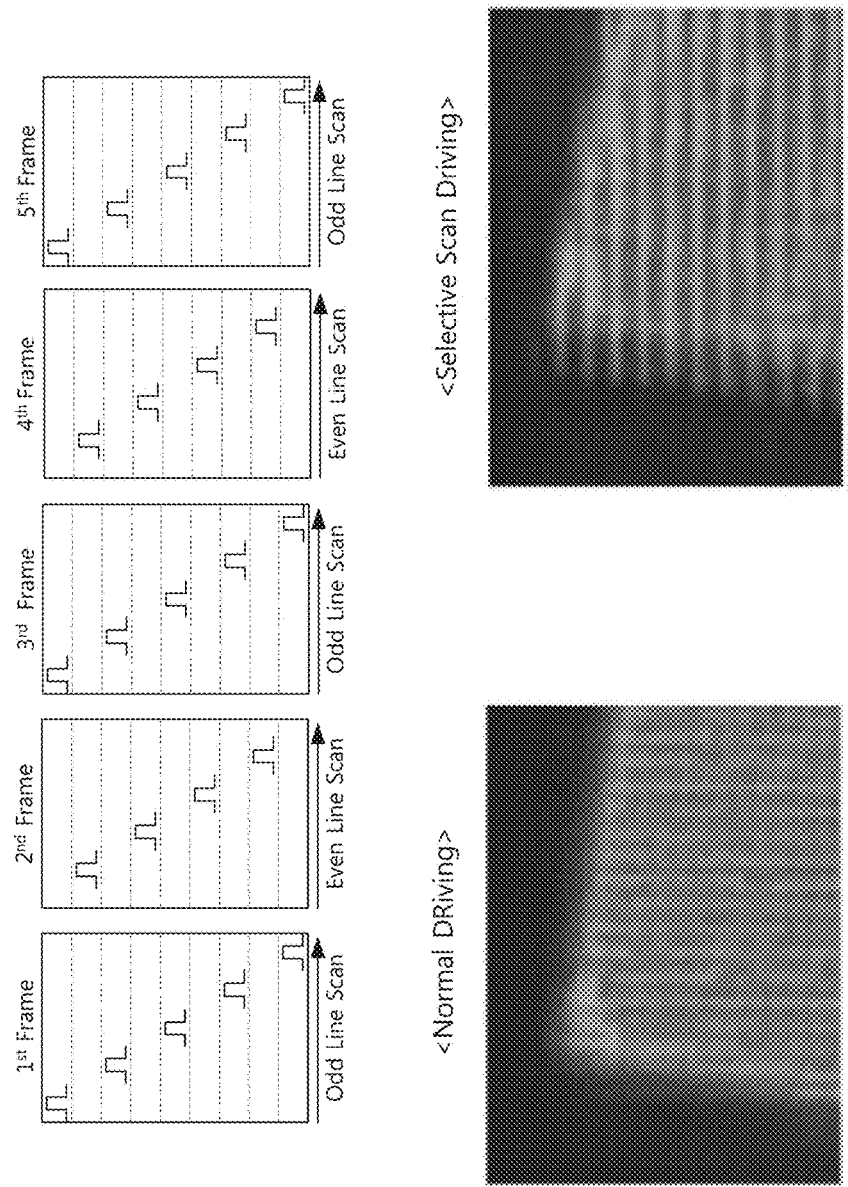
FIGS. 7 to 9 illustrate images displayed by various scan methods applied to a peripheral area of the VR display device according to an embodiment of the present disclosure.
Figure 8:
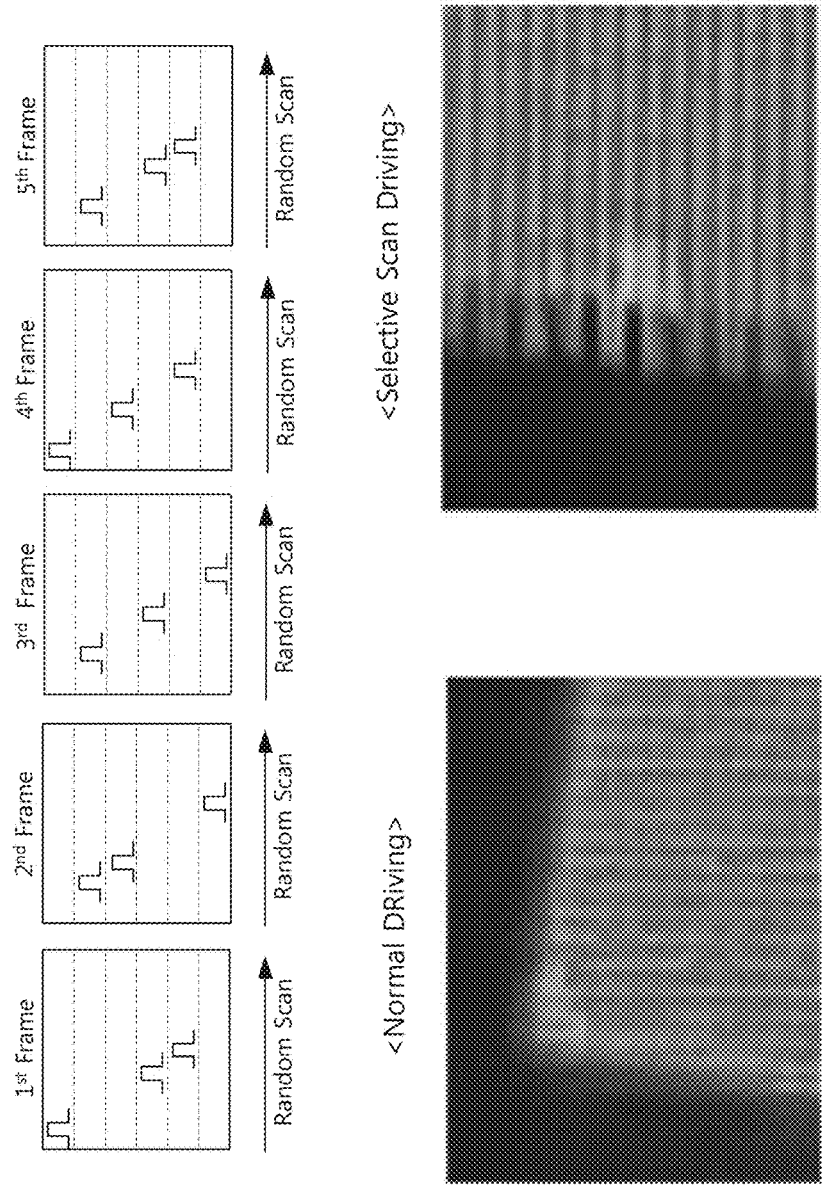
Figure 9:
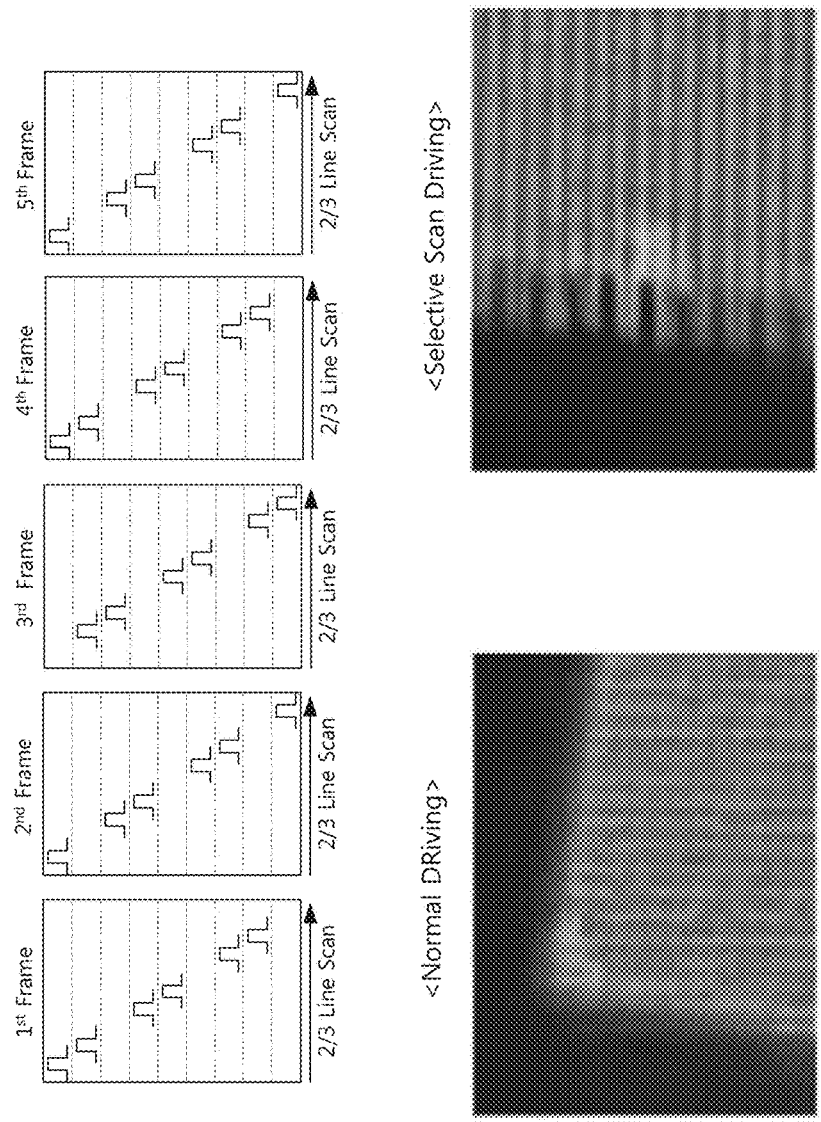

FIGS. 7 to 9 illustrate results of displaying images by various selective scan methods applied to a scan block including only a peripheral area (PA) of the VR display device according to an embodiment of the present disclosure.

FIG. 7 illustrates a result of updating data while sequentially scanning odd horizontal lines in odd frames and updating data while sequentially scanning even horizontal lines in even frames. FIG. 8 illustrates a result of updating data while sequentially scanning randomly selected horizontal lines corresponding to a half of horizontal lines in each frame. In the case, a scan sequence and pattern capable of minimizing an influence on picture quality may be applied. For example, if the 1st, 4th, and 5th horizontal lines are scanned in one frame, 2nd, 3rd, and 6th horizontal lines may be scanned in the next frame, thereby balancing light emission of pixels. FIG. 9 illustrates a result of updating data while sequentially scanning horizontal lines corresponding to ⅔ of horizontal lines in each frame. As illustrated in FIGS. 7 to 9, if data is updated by scanning only ½ or ⅔ of the horizontal lines in each frame, it can be appreciated that these selective scan methods are applicable to the peripheral area (PA) in which a user has a difficulty in recognizing images although picture quality is lowered by some degree compared with normal driving.

Figure 10:
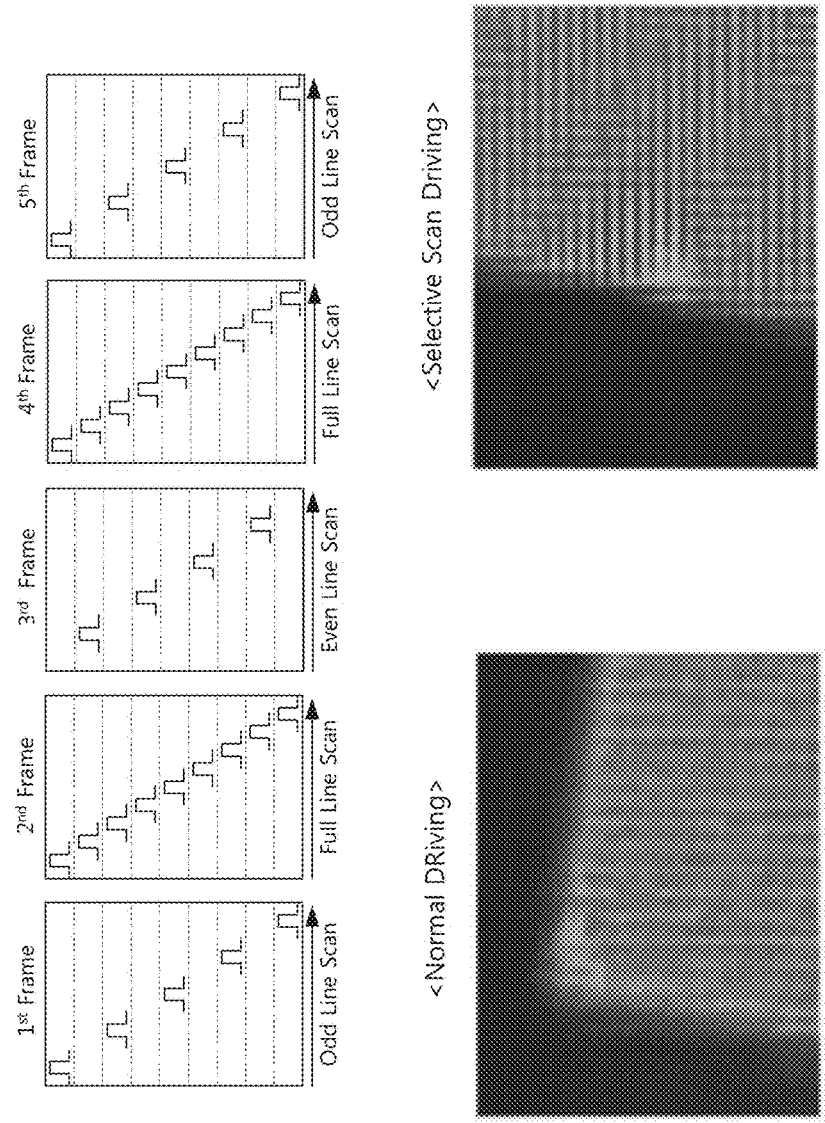
FIG. 10 illustrates images displayed by various scan methods applied to a medial area of the VR display device according to an embodiment of the present disclosure.

FIG. 10 illustrates a result of displaying an image by a selective scan method applied to scan blocks including an medial area (MA) and a peripheral area (PA) except for an foveal area (FA) of the VR display device according to an embodiment of the present invention.

Referring to FIG. 10, an image is displayed by applying the selective scan method in such a manner that odd horizontal lines are sequentially scanned in the first frame, all horizontal lines are sequentially scanned in the second frame, even horizontal lines are sequentially scanned in the third frame, and all horizontal lines are sequentially scanned in the fourth frame. As a result, data is updated while ¾ of the horizontal lines are scanned, thereby shortening a driving time and having nearly no affect on picture quality as compared with normal driving.

As described above, the display device according to an embodiment of the present disclosure and a method of driving the same can reduce the number of scans to thus reduce a driving time and can reduce an output frequency of a data driver to thus decrease power consumption, by selectively scanning scan blocks including only an medial area (MA) and a peripheral area (PA) except for a scan block including an foveal area (FA) or selectively scanning the scan blocks including only the peripheral area (PA) and updating image data only with respect to the scanned pixels.

The display device according to an embodiment of the present disclosure and a method of driving the same can efficiently drive even a large-size VR display device by decreasing a driving time and power consumption.

It will be apparent to those skilled in the art that various modifications and variations can be made in the present invention without departing from the spirit or scope of the invention. Thus, the present invention is intended to cover the modifications and variations of this invention within the scope of the appended claims and their equivalents.

What is claimed is:

1. A display device comprising:
a display panel including a plurality of pixels and configured to display an image, the display panel including:
a foveal area that corresponds to a main viewing area of a user, the foveal area displaying a first portion of the image;
a medial area that surrounds the foveal area, the medial area displaying a second portion of the image with a lower resolution than the first portion of the image displayed in the foveal area; and
a peripheral area that surrounds the medial area, the peripheral area displaying a third portion of the image with a lower resolution than the second portion of the image displayed in the medial area;
a gate driver configured to:
scan a first subset of a plurality of rows of the pixels in a first scan block that is included in a first portion of the peripheral area during a first frame;
scan a second subset of the plurality of rows of the pixels in the first scan block included in the first portion of the peripheral area during the second frame;
scan a third subset of a plurality of rows of the pixels in a second scan block that is included in a first portion of the medial area and a second portion of the peripheral area excluding the foveal area during the first frame;
scan a fourth subset of the plurality of rows of pixels in the second scan block that is included in the first portion of the medial area and the second portion of the peripheral area excluding the foveal area during the second frame, the fourth subset of the plurality of rows of pixels having a greater number of rows of pixels than the third subset of the plurality of rows of the pixels; and
scan a plurality of rows of the pixels in a third scan block that is included in the foveal area, a second portion of the medial area, and a third portion of the peripheral area during the first frame and the second frame; and
a data driver configured to supply image data to pixels scanned by the gate driver.

2. The display device according to claim 1, wherein the first subset of the plurality of rows of the pixels in the first scan block comprises odd rows of the pixels in the first scan block and wherein the second subset of the plurality of rows of the pixels in the first scan block comprises even rows of the pixels in the first scan block.

3. The display device according to claim 1, wherein the third subset of the plurality of rows of the pixels in the second scan block comprises either odd rows or even rows of the pixels in the second scan block and wherein the fourth subset of the plurality of rows of the pixels in the first scan block comprises all rows of the pixels in the second scan block.

4. The display device according to claim 1, wherein the plurality of rows of the pixels in the third scan block comprises all rows of the pixels in the third scan block.

5. The display device according to claim 1, wherein the gate driver includes:
a first gate driving block configured to scan the first subset of the plurality of rows of the pixels in the first scan block during the first frame and scan the second subset of the plurality of rows of the pixels in the first scan block during the second frame;
a second gate driving block configured to scan the third subset of the plurality of rows of the pixels in the second scan block during the first frame and scan the fourth subset of the plurality of rows of the pixels in the second scan block during the second frame; and
a third gate driving block configured to scan all of the plurality of rows of the pixels in the third scan block during the first frame and the second frame, and
wherein a total number of scans performed by the first gate driving block during the first frame and second frame is less than a total number of scans performed by the second gate driving block during the first frame and the second frame.

6. The display device according to claim 1, wherein the display panel further includes:
a fourth scan block including a third portion of the medial area and a fourth portion of the peripheral area excluding the foveal area, the third scan block positioned between the second scan block and the fourth scan block;
the gate driver further includes a fourth gate driving block configured to:
scan a fifth subset of a plurality of rows of the pixels in the fourth scan block that is included in the third portion of the medial area and the fourth portion of the peripheral area excluding the foveal area during the first frame;
scan a sixth subset of the plurality of rows of the pixels in the fourth scan block that is included in the third portion of the medial area and the fourth portion of the peripheral area excluding the foveal area during the second frame, the fifth subset of the plurality of rows of the pixels having a greater number of rows of pixels than the sixth subset of the plurality of rows of the pixels.

7. The display device according to claim 6, wherein the fifth subset of the plurality of rows of the pixels in the fourth scan block comprises either odd rows or even rows of the pixels in the fourth scan block and wherein the sixth subset of the plurality of rows of the pixels in the fourth scan block comprises all rows of the pixels in the fourth scan block.

8. The display device according to claim 7, wherein the display panel further includes:
a fifth scan block including only a fifth portion of the peripheral area;
the gate driver further includes a fifth gate driving block configured to scan a seventh subset of a plurality of rows of the pixels that is included in the fifth portion of the peripheral area during the first frame and scan an eighth subset of a plurality of rows of the pixels that is included in the fifth portion of the peripheral area during the second frame; and.
wherein the second scan block, the third scan block, and the fourth scan block are positioned between the first scan block and the fifth scan block in the display panel.

9. The display device according to claim 8, wherein the seventh subset of the plurality of rows of the pixels in the fifth scan block comprises odd rows of the pixels in the fifth scan block and wherein the eighth subset of the plurality of rows of the pixels in the fifth scan block comprises even rows of the pixels in the fifth scan block.

10. The display device according to claim 8, wherein the data driver outputs image data in a period during which the first scan block, the second scan block, the fourth scan block, and the fifth scan block are scanned.

11. The display device according to claim 10, wherein the data driver supplies image data of each pixel in the foveal area through a individually driven data line that is connected to the pixel, and supplies the same image data to a plurality of pixels in the medial area and the peripheral area through data lines that are grouped into a plurality of data lines and
wherein a number of pixels that is supplied the same image data in the peripheral area is greater than a number of pixels that is supplied the same image data in the medial area.

12. A method of driving a display device that includes a display panel that includes a plurality of pixels configured to display an image, the display panel comprising a foveal area that corresponds to a main viewing area that displays a first portion of the image, a medial area surrounding the foveal area and displaying a second portion of the image with a lower resolution than the first portion of the image displayed in the foveal area, and a peripheral area surrounding the medial area and displaying a third portion of the image with a lower resolution than the second portion of the image displayed in the medial area, the method comprising:
scanning a first subset of a plurality of rows of the pixels in a first scan block that is included in a first portion of the peripheral area during a first frame;
scanning a second subset of a plurality of rows of the pixels in the first scan block that is included in the first portion of the peripheral area during a second frame;
scanning a third subset of a plurality of rows of the pixels in a second scan block that is included in a first portion of the medial area and a second portion of the peripheral area excluding the foveal area during the first frame;
scanning a fourth subset of the plurality of rows of the pixels in the second scan block that is included in the first portion of the medial area and the second portion of the peripheral area excluding the foveal area during the second frame, the fourth subset of the plurality of rows of pixels having a greater number of rows of pixels than the third subset of the plurality of rows of the pixels;
scanning a plurality of rows of the pixels in a third scan block that is included in the foveal area, a second portion of the medial area, and a third portion of the peripheral area during the first frame and the second frame; and
supplying image data to scanned pixels in the first scan block, the second scan block, and the third scan block during the first frame and the second frame.

13. The method according to claim to claim 12, wherein the first subset of the plurality of rows of the pixels in the first scan block comprises odd rows of the pixels in the first scan block and wherein the second subset of the plurality of rows of the pixels in the first scan block comprises even rows of the pixels in the first scan block.

14. The method according to claim to claim 12, wherein the third subset of the plurality of rows of the pixels in the second scan block comprises either odd rows or even rows of the pixels in the second scan block and wherein the fourth subset of the plurality of rows of the pixels in the first scan block comprises all rows of the pixels in the second scan block.

15. The method according to claim to claim 12, wherein the plurality of rows of the pixels in the third scan block comprises all rows of the pixels in the third scan block.

16. The method according to claim 12, further comprises:
scanning a fifth subset of a plurality of rows of the pixels in a fourth scan block that is included in a third portion of the medial area and a fourth portion of the peripheral area excluding the foveal area during the first frame;
scanning a sixth subset of the plurality of rows of the pixels in the fourth scan block that is included in the third portion of the medial area and the fourth portion of the peripheral area excluding the foveal area during the second frame, the fifth subset of the plurality of rows of the pixels having a greater number of rows of pixels than the sixth subset of the plurality of rows of the pixels,
wherein the third scan block is positioned between the second scan block and the fourth scan blocks.

17. The method according to claim 16, further comprises:
scanning a seventh subset of a plurality of rows of the pixels that is included in a fifth portion of the peripheral area during the first frame;
scanning an eighth subset of a plurality of rows of the pixels that is included in the fifth portion of the peripheral area during the second frame,
wherein the second scan block, the third scan block, and the fourth scan block are positioned between the first scan block and the fifth scan block in the display panel.

18. The method according to claim 17, wherein the seventh subset of the plurality of rows of the pixels in the fifth scan block comprises odd rows of the pixels in the fifth scan block and wherein the eighth subset of the plurality of rows of the pixels in the fifth scan block comprises even rows of the pixels in the fifth scan block.

19. The method according to claim 17, wherein a data driver outputs image data in a period during which the first scan block, the second scan block, the fourth scan block, and the fifth scan block are scanned.

20. The method according to claim 18, wherein the data driver:
supplies image data of each pixel in the foveal area through a individually driven data line that is connected to the pixel, and
supplies the same image data to a plurality of pixels in the medial area and the peripheral area through data lines that are grouped into a plurality of data lines, and
wherein a number of pixels that is supplied the same image data in the peripheral area is larger than a number of pixels that is supplied the same image data in the medial area.

* * * * *